United States Patent
Redert (10) Patent No.: US 7,085,410 B2
(45) Date of Patent: Aug. 1, 2006

(54) IMAGE PROCESSING UNIT FOR AND METHOD OF GENERATING A FIRST OUTPUT IMAGE AND A SECOND OUTPUT IMAGE AND IMAGE DISPLAY APPARATUS PROVIDED WITH SUCH AN IMAGE PROCESSING UNIT

(75) Inventor: Peter-Andre Redert, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 733 days.

(21) Appl. No.: 10/198,497

(22) Filed: Jul. 18, 2002

(65) Prior Publication Data

US 2003/0020708 A1    Jan. 30, 2003

(30) Foreign Application Priority Data

Jul. 23, 2001    (EP)    ................... 01202818

(51) Int. Cl.
*G06K 9/00* (2006.01)
(52) U.S. Cl. .................. 382/154; 348/51; 359/462
(58) Field of Classification Search ............... 382/100, 382/154; 348/42, 46–60, 51; 345/419; 359/462, 359/464; 600/166
See application file for complete search history.

(56) References Cited

U.S. PATENT DOCUMENTS

| 4,761,066 | A | * | 8/1988 | Carter | 359/371 |
| 5,083,851 | A | * | 1/1992 | MacDonald | 359/462 |
| 5,258,833 | A | * | 11/1993 | Schenk | 348/51 |
| 6,055,274 | A | * | 4/2000 | McVeigh | 375/240.16 |
| 6,573,928 | B1 | * | 6/2003 | Jones et al. | 348/51 |
| 6,697,100 | B1 | * | 2/2004 | Tatsuzawa | 348/48 |
| 6,703,988 | B1 | * | 3/2004 | Fergason | 345/6 |

* cited by examiner

Primary Examiner—Matthew C. Bella
Assistant Examiner—Sheela Chawan (57) ABSTRACT

Disclosed in an image processing unit for generating, based on a plurality of input images, a first output image and a second output image, to be displayed on a stereoscopic display device, wherein a stereoscopic image and a monoscopic image can be displayed. The image processing unit including an offset calculator designed to calculate an offset image based on a first one of the input images, an addition unit designed to calculate the first output image by adding the offset image with a second one of the input images and a subtraction unit designed to calculate the second output image by subtracting the offset image from the second one of the input images.

10 Claims, 6 Drawing Sheets

IMAGE PROCESSING UNIT FOR AND METHOD OF GENERATING A FIRST OUTPUT IMAGE AND A SECOND OUTPUT IMAGE AND IMAGE DISPLAY APPARATUS PROVIDED WITH SUCH AN IMAGE PROCESSING UNIT

The invention relates to an image processing unit for generating, based on a number of input images, a first output image and a second output image, to be displayed on a stereoscopic display device resulting in:
- a stereoscopic image in the case of a first observer who perceives the first output image and the second output image substantially separate in a left and a right eye; and
- a monoscopic image in the case of a second observer who perceives the first output image and the second output image substantially both in both eyes.

The invention further relates to a method of generating, based on a number of input images, a first output image and a second output image, to be displayed on a stereoscopic display device resulting in:
- a stereoscopic image in the case of a first observer who perceives the first output image and the second output image substantially separate in a left and a right eye; and
- a monoscopic image in the case of a second observer who perceives the first output image and the second output image substantially both in both eyes.

The invention further relates to an image display apparatus comprising:
- an image processing unit for generating, based on a number of input images, a first output image and a second output image, to be displayed on a stereoscopic display device resulting in:
- a stereoscopic image in the case of a first observer who perceives the first output image and the second output image substantially separate in a left and a right eye; and
- a monoscopic image in the case of a second observer who perceives the first output image and the second output image substantially both in both eyes; and
- the stereoscopic display device.

An embodiment of the image processing unit of the kind described in the opening paragraph is known from the article "Just enough reality: Comfortable 3-D viewing via microstereopsis", in IEEE Transactions on Circuits and Systems for Video Technology, Vol.10, No.3, pp. 387–396, 2000.

In conventional glasses based stereoscopic systems observers who are wearing appropriate glasses can observe stereoscopic images. With glasses, an observer perceives the left and right image substantially separate in the left respectively the right eye. Without the filtering effect of the glasses there is cross-talk. An observer perceives a double image: left and right image are mixed and visible to both eyes.

In the cited article the lower limits of the interocular separation, i.e. microstereopsis, are exploited, showing that unexpectedly small disparities stimulate accurate and pleasant depth sensation. It is stated that such "mild" 3D leaves the perception of depth presence unaltered. It also might result in increased viewing comfort during prolonged 3D viewing. Under the described circumstances, cross-talk is perceived as depth-of-focus, rather than as ghosting. In other words, in the case of a small base-line between the cameras, the cross-talk is perceived as blur rather than as doubling: an observer without glasses sees a blurred monoscopic image, with an acceptable quality. By regulating the base-line between the cameras, a trade-off can be made between monoscopic image quality and the amount of 3D effect. When the base-line between the cameras is lowered, the depth effect for observers wearing glasses becomes less. Extreme 3D effects are no longer possible. On the other hand, the artifacts caused by the cross-talk for observers not wearing glasses becomes less. However, it is a disadvantage that, even in the case of a relatively small base-line between the cameras, the monoscopic image shows these artifacts.

It is a first object of the invention to provide an image processing unit of the kind described in the opening paragraph with a relatively high monoscopic image quality.

It is a second object of the invention to provide a method of the kind described in the opening paragraph resulting in a relatively high monoscopic image quality.

It is a third object of the invention to provide an image display apparatus of the kind described in the opening paragraph with a relatively high monoscopic image quality.

The first object of the invention is achieved in that the image processing unit comprises:
- an offset calculator designed to calculate an offset image based on a first one of the input images;
- an addition unit designed to calculate the first output image by adding the offset image with a second one of the input images; and
- a subtraction unit designed to calculate the second output image by subtracting the offset image from the second one of the input images.

For ease of explanation, three cameras positioned nicely in line are introduced which provide the input images to the image processing unit. See FIG. 1A. The middle camera provides the monoscopic input image I: when displayed on a standard display device an observer observes a monoscopic image. The left and right camera provide the input images $I_L$ and $I_R$: when displayed together on a stereoscopic display device, the observer observes a stereoscopic image.

The image processing unit receives at least one of the input images. Processing the image/images result in a first output image $I^*_L$ and a second output image $I^*_R$. When these two output images are displayed on an appropriate stereoscopic display device, a stereoscopic and a monoscopic image can be observed. This depends on whether an observer wears glasses or not:
- In the case that an observer uses glasses a stereoscopic image is observed. This means: $I^*_L \approx I_L$ and $I^*_R \approx I_R$
- In the case that an observer does not use glasses a monoscopic image is observed. This means: $I^* \approx I$, with $I^*$ the observed monoscopic output image.

The image processing unit processes the input images to yield a first output image $I^*_L$ and a second output image $I^*_R$ which are equal to the monoscopic input image I plus or minus some offset image $\Delta I$. In Equations:

$$I^*_L = I + \Delta I \quad (1)$$

$$I^*_R = I - \Delta I \quad (2)$$

By separating the first output image $I^*_L$ and the second output image $I^*_R$ by means of a stereoscopic display device in combination with appropriate glasses, an observer sees a stereoscopic image. This observer can make a distinction between the two output images resulting in a 3D effect: a stereoscopic image. An observer without glasses, mixes the two output images. This observer can not make a distinction between the two output images. This observer sees a monoscopic image which is perceptual substantial equal to the monoscopic input image I.

$$I^* = I^*_R + I^*_L = I + \Delta I + I - \Delta I = 2I \quad (3)$$

The advantage of the image processing unit is that the monoscopic image quality is substantially independent of the amount of 3D effect. This means that observers who do not want to wear glasses have a relatively high monoscopic image quality. But simultaneously observers, who want to wear glasses observe stereoscopic images with relatively high quality.

In an embodiment of the image processing unit according to the invention, the offset calculator is designed to calculate the offset image by subtracting a third one of the input images from the first one of the input images and dividing by a constant substantially equal to two. The first one of the input images, the second one of the input images and the third one of the input images can be captured by a triple camera. It is also possible that the images are captured with one camera being moved in between the capturing moments. Further it is possible that the images are generated by a graphics system. $\Delta I$ is chosen as half the difference between the first one of the input images and the third one of the input images. Assume that $I_L$ is the first one of the input images and $I_R$ the third one of the input images. Then:

$$\Delta I = \frac{(I_L - I_R)}{2} \quad (4)$$

The advantage is that the output images $I^*_L$ and $I^*_R$ resemble the input images $I_L$ respectively $I_R$ most. As luminance is bound, e.g. to [0,255], it is preferred that the addition and subtraction of $\Delta I$ is followed by clipping to ensure that $I^*_L$ and $I^*_R$ contain valid luminance values. Scaling the input images is an alternative.

In another embodiment of the image processing unit according to the invention, the offset calculator is designed to calculate the offset image by subtracting the second one of the input images from the first one of the input images. The first one of the input images and the second one of the input images can be captured by a stereo camera. It is also possible that the images are captured with one camera being moved in between the capturing moments. Further it is possible that the images are generated by a graphics system. $\Delta I$ is chosen as the difference between the first one of the input images and the second one of the input images. Assume that $I_L$ is the first one of the input images and I the second one of the input images. Then:

$$\Delta I = I_L - I \quad (5)$$

The advantage is that use can be made of standard stereo cameras for the acquisition of the images while achieving relatively good and easy stereoscopic and monoscopic images.

In another embodiment of the image processing unit according to the invention, the offset calculator is designed to calculate the offset image by differentiating the first one of the input images. In this case there is only one input image: the second one of the input images is equal to the first one of the input images. The offset image is directly calculated from this input image. The advantage is that it is easy to compute and very robust. It gives a mild 3D effect, which is not necessarily related to actual depth in the scene. It is assumed that a luminance transition in an image corresponds with a depth transition. The first one of the input images can be captured by a mono camera or generated by a graphics system. An example of a method of calculating an offset image is given in Equation 6.

$$\Delta I = \alpha + \beta |\nabla I|^\gamma \quad (6)$$

An embodiment of the image processing unit according to the invention further comprises a render unit designed to render the input images based on a captured image and a depth map. It is an advantage that images can be rendered as if they originate from a triple or stereo camera set-up. From that point on, the processing can be used from these set-ups, as described above.

In an embodiment of the image processing unit according to the invention comprising the render unit, the depth map is provided by a depth camera. By using a depth camera the depth map is directly available. Estimating depth out of one or more images is a relatively complex problem. Hence it is an advantage if the depth map is provided by the depth camera.

An embodiment of the image processing unit according to the invention comprising the render unit further comprises a depth estimation unit designed to generate the depth map based on the captured image. This concept is described e.g. by P. Wilinski and K. van Overveld in the article "Depth from motion using confidence based block matching" in Proceedings of Image and Multidimensional Signal Processing Workshop, pages 159–162, Alpbach, Austria, 1998. The advantage of this embodiment according to the invention is that even from video sequences captured with standard mono cameras, images can be created with 3D-effect.

The second object of the invention is achieved in that method comprises the steps of:
  calculating an offset image based on a first one of the input images;
  calculating the first output image by adding the offset image with a second one of the input images; and
  calculating the second output image by subtracting the offset image from the second one of the input images.

The third object of the invention is achieved in that the image processing unit of the image display apparatus comprises:
  an offset calculator designed to calculate an offset image based on a first one of the input images;
  an addition unit designed to calculate the first output image by adding the offset image with a second one of the input images; and
  a subtraction unit designed to calculate the second output image by subtracting the offset image from the second one of the input images.

The image display apparatus may comprise components like a receiving means, a decoder and storage means. Modifications of the image processing unit and variations thereof may correspond to modifications and variations thereof of the method and of the image display apparatus described.

These and other aspects of the image processing unit, of the method and of the image display apparatus according to the invention will become apparent from and will be elucidated with respect to the implementations and embodiments described hereinafter and with reference to the accompanying drawings, wherein.

Corresponding reference numerals have the same meaning in all of the Figures.

Figure 1A:
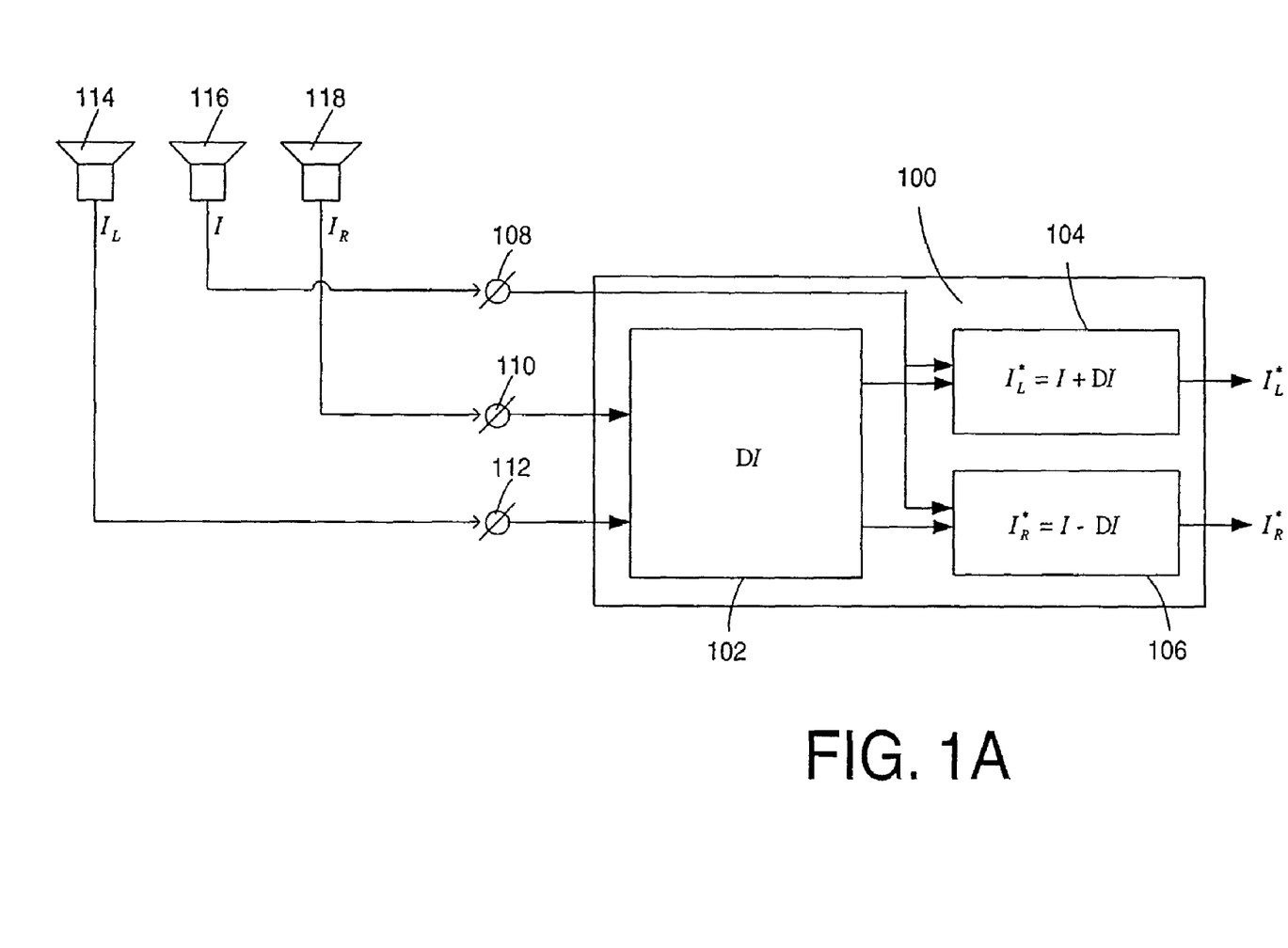
FIG. 1A schematically shows an embodiment of the image processing unit connected to a triple camera.

FIG. 1A schematically shows an embodiment of the image processing unit 100 connected to a triple camera comprising the cameras 114, 116, 118 that capture the images $I_L$, I respectively $I_R$. These images are provided to the image processing unit 100 via its input connectors 108, 110, 112. The image processing unit 100 is designed to generate a first output image $I*_L$ and a second output image $I*_R$. The image processing unit 100 comprises:

- an offset calculator 102 designed to calculate an offset image ΔI based on the input images $I_L$ and $I_R$ according to Equation 4.
- an addition unit 104 designed to calculate the first output image $I*_L$ by adding the offset image ΔI with the input image I according to Equation 1; and
- a subtraction unit 106 designed to calculate the second output image $I*_R$ by subtracting the offset image ΔI from the input image I according to Equation 2.

Figure 1B:
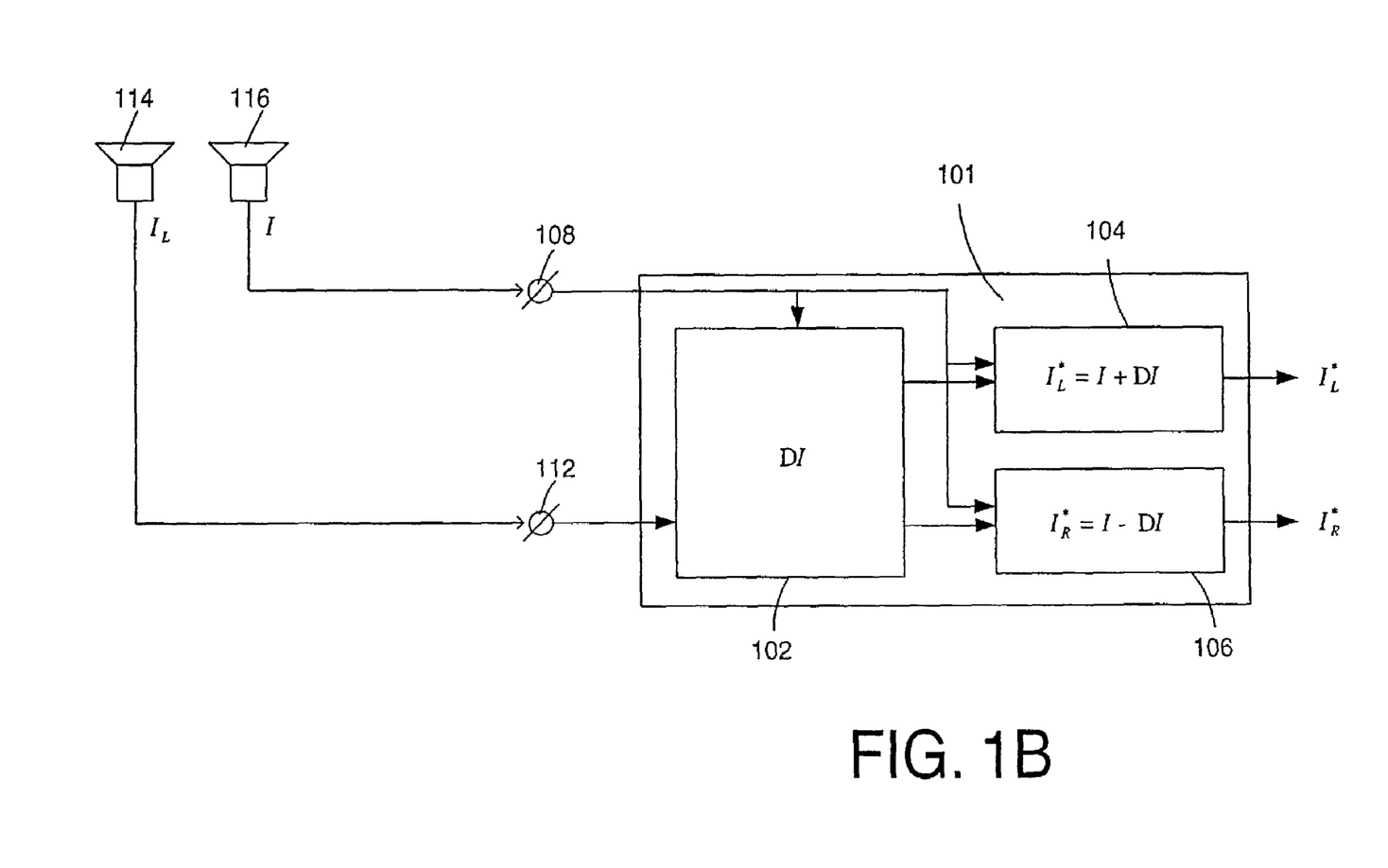
FIG. 1B schematically shows an embodiment of the image processing unit connected to a stereo camera.

FIG. 1B schematically shows an embodiment of the image processing unit 101 connected to a stereo camera comprising the cameras 114 and 116 that capture the images $I_L$ respectively I. These images are provided to the image processing unit 101 via its input connectors 108 and 112. The image processing unit 101 is designed to generate a first output image $I*_L$ and a second output image $I*_R$. The image processing unit 101 comprises an offset calculator 102 designed to calculate an offset image ΔI based on the input images $I_L$ and I according to Equation 5.

Figure 1C:
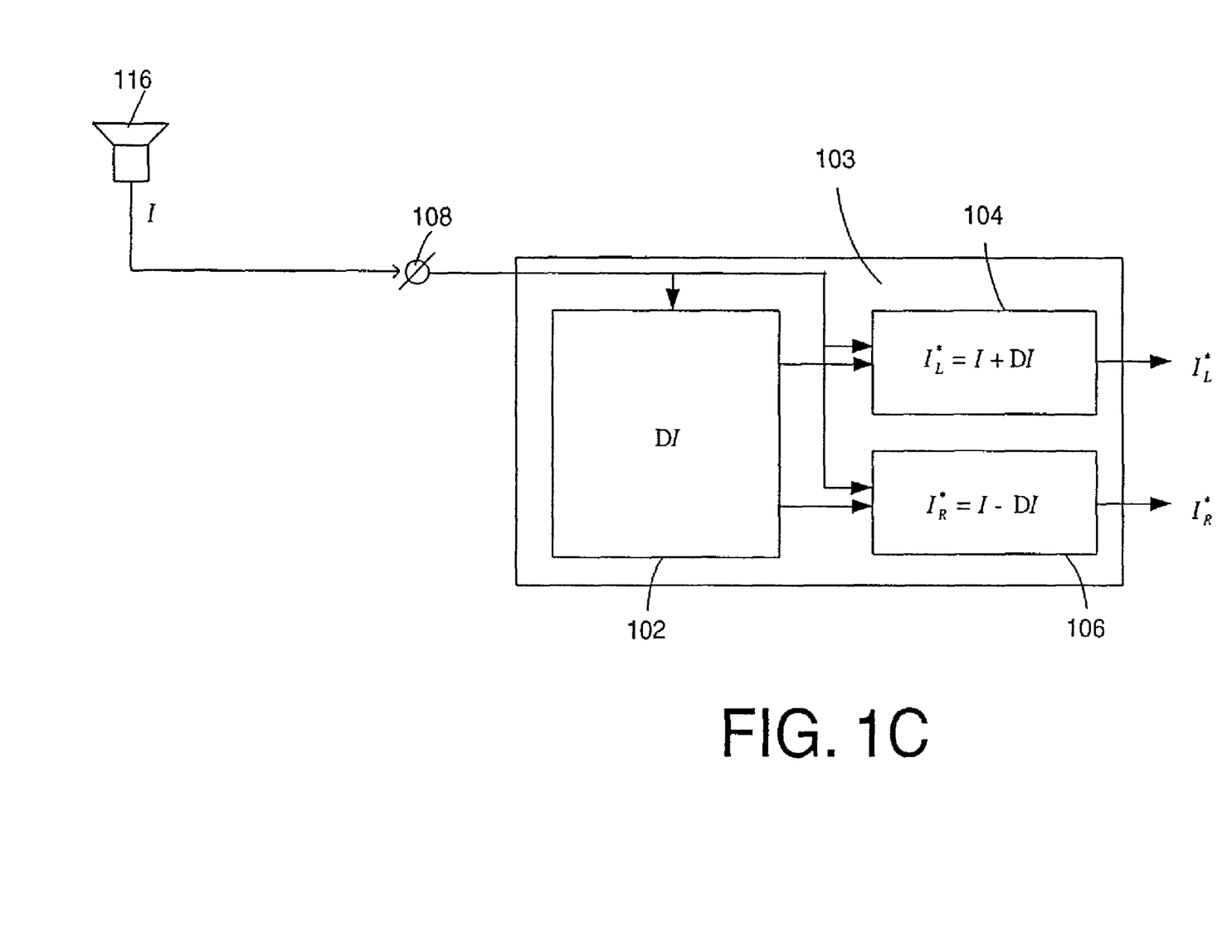
FIG. 1C schematically shows an embodiment of the image processing unit connected to a mono camera.

FIG. 1C schematically shows an embodiment of the image processing unit 103 connected to a mono camera 116 that captures the image I. This image is provided to the image processing unit 103 via its input connector 108. The image processing unit 103 is designed to generate a first output image $I*_L$ and a second output image $I*_R$. The image processing unit 103 comprises an offset calculator 102 designed to calculate an offset image ΔI based on the input image I according to Equation 6.

Figure 2A:
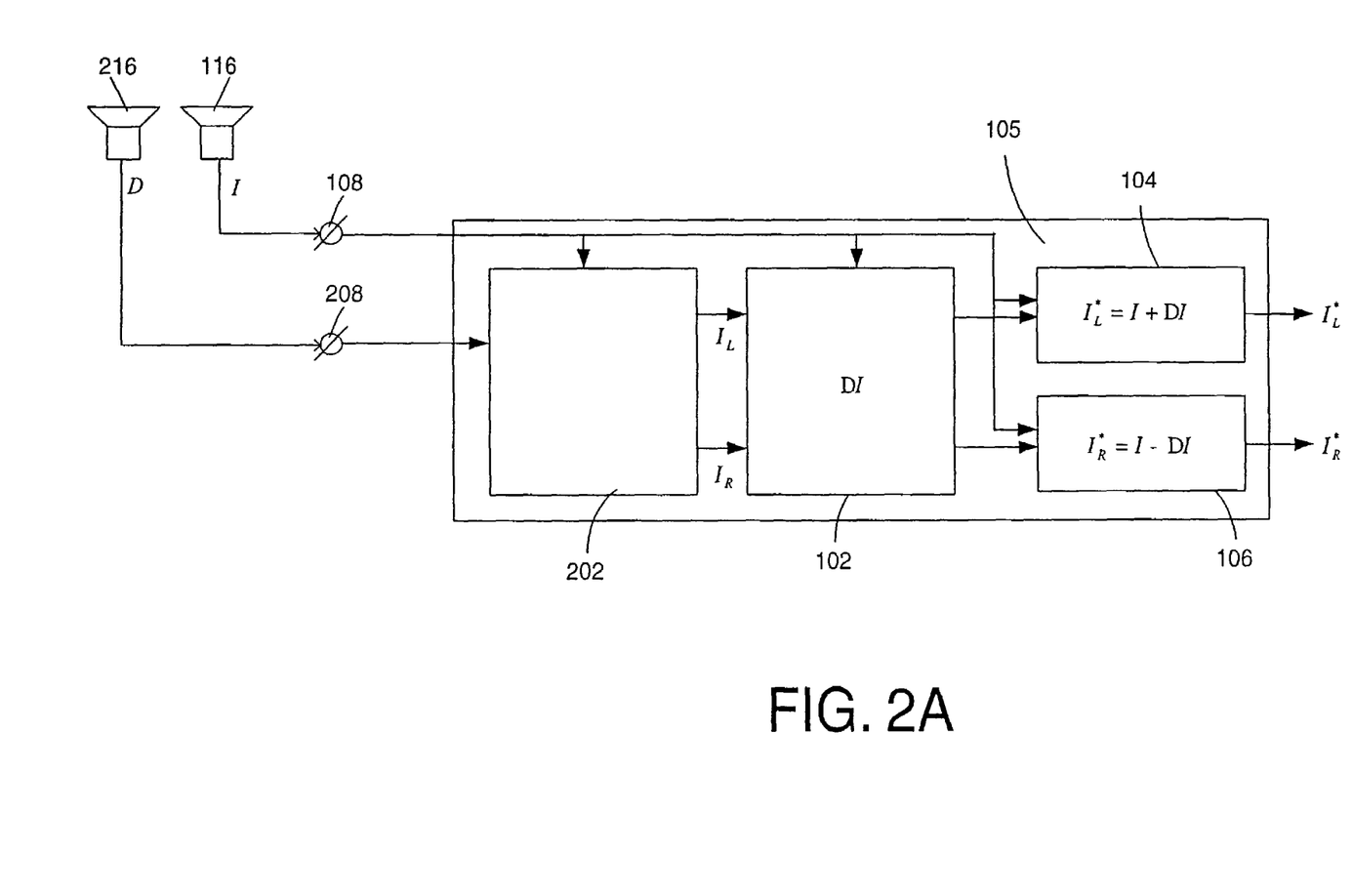
FIG. 2A schematically shows an embodiment of the image processing unit comprising a renderer.

FIG. 2A schematically shows an embodiment of the image processing unit 105 comprising a renderer 202. The image processing unit 105 receives its input via the input connectors 108 and 208. Camera 116 captures an image I with pixels representing luminance values. Camera 216 captures a depth map with pixels representing depth values. The input images $I_L$ and $I_R$ are created through a parallactic transformation of image I. This means that depth dependent pixel shifts are calculated which are used to achieve the input images $I_L$ and $I_R$. This type of processing is disclosed in e.g. U.S. Pat. No. 5,929,859. In that disclosure it is specified that undesired holes or overlaps resulting from the shifts are avoided. The image processing unit 105 comprises an offset calculator 102 designed to calculate an offset image ΔI based on the input images $I_L$ and $I_R$ according to Equation 4 and/or on the input images $I_L$ and I according to Equation 5.

Figure 2B:
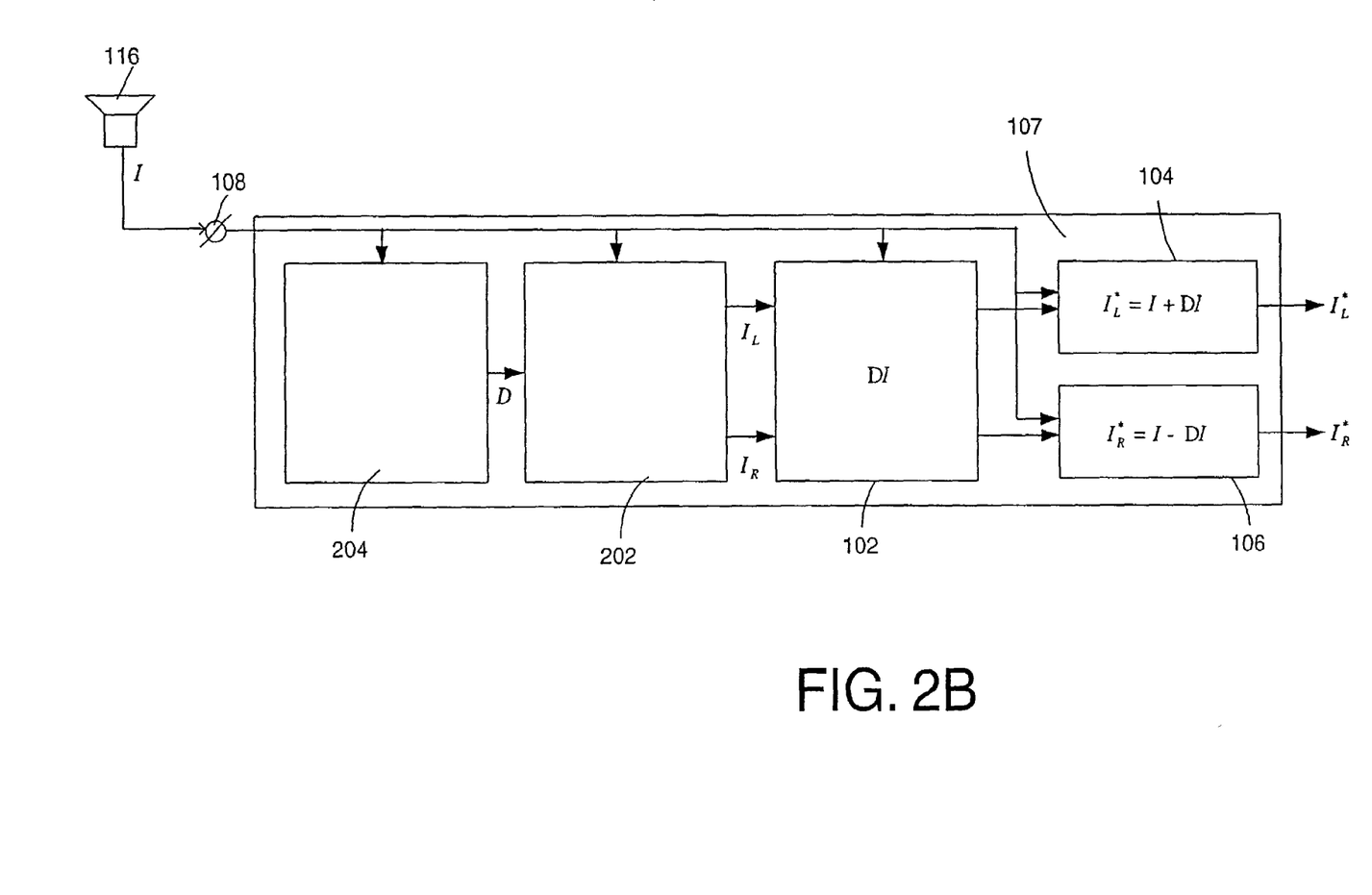
FIG. 2B schematically shows an embodiment of the image processing unit comprising a depth estimation unit.

FIG. 2B schematically shows an embodiment of the image processing unit 107 comprising a renderer 202 and a depth estimation unit 204. The image processing unit 107 receives its input via the input connector 108. Camera 116 captures an image I with pixels representing luminance values. The input images $I_L$ and $I_R$ are created through a parallactic transformation of image I and on depth maps D which are created by the depth estimation unit 204. The depth estimation unit 204 is designed as described in e.g. the article "Depth from motion using confidence based block matching" by P. Wilinski and K. van Overveld in Proceedings of Image and Multidimensional Signal Processing Workshop, pages 159–162, Alpbach, Austria, 1998. The image processing unit 107 comprises an offset calculator 102 designed to calculate an offset image ΔI based on the input images $I_L$ and $I_R$ according to Equation 4 and/or on the input images $I_L$ and I according to Equation 5.

Figure 3:
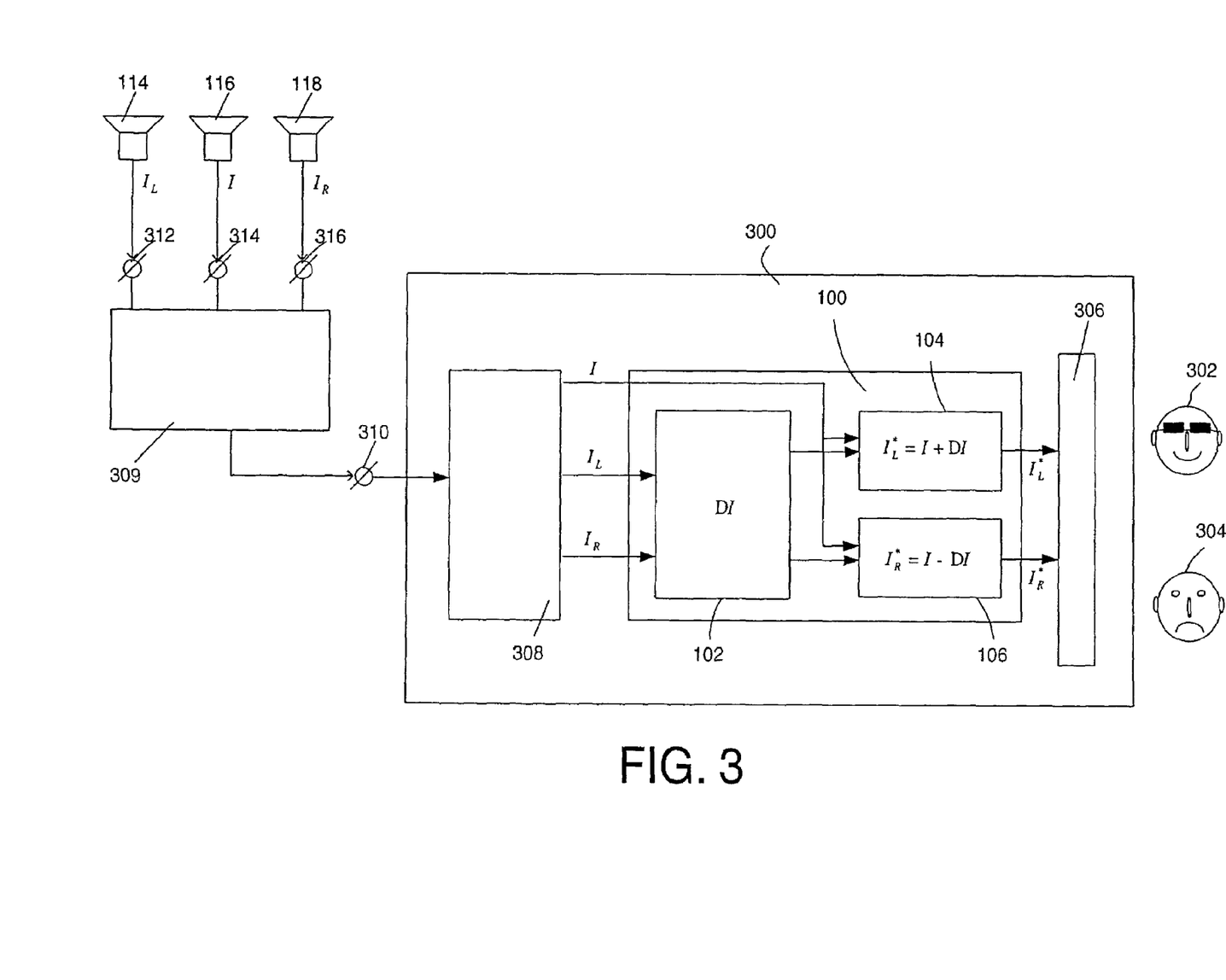
FIG. 3 schematically shows an embodiment of the image display apparatus in its context.

FIG. 3 schematically shows an embodiment of the image display apparatus 300 in its context. FIG. 3 shows a multiplexer 309 connected to the cameras 114, 116, 118 that capture the images $I_L$, I respectively $I_R$ and provide the images to the multiplexer via its input connectors 312, 314, 316. This multiplexer 309 is designed to encode the data representing the captured images and to transmit the encoded data. The encoded data is provided to the image display apparatus 300 via the input connector 310. The image display apparatus 300 comprises:

- a receiving means 308 for receiving the encoded data and to decode the data resulting in the images $I_L$, I and $I_R$;
- an image processing apparatus 100 as described in connection with FIG. 1A; and
- a stereoscopic display device 306 which is designed to substantially separately display the output images $I*_L$ and $I*_R$ e.g. by time multiplexing.

The result is:

- a stereoscopic image in the case of a first observer 302 who perceives the first output image $I*_L$ and the second output image $I*_R$ substantially separate in a left and a right eye; and
- a monoscopic image in the case of a second observer 304 who perceives the first output image $I*_L$ and the second output image $I*_R$ substantially both in both eyes. Many display techniques for displaying stereoscopic images are known. Using a time-parallel technique, both output images are presented simultaneously to one or two displays. For example, both output images may be filtered with complementary colors and mixed on one display. The observer wears glasses with filters that match the projection filters. As another example, two displays may be used to present two differently polarized pictures, which are viewed through corresponding polarized glasses. In time-multiplexed techniques the left and the right images are alternatively displayed on one display. As an example, one image is written to the even scan lines and the other image to the odd scan lines. A shutter system is used to occlude the right eye when the left-eye image is displayed. The shutter system may be mounted in glasses worn by the observer. Alternatively, a shutter with controllable polarizer is placed in front of the display and the observer wears a head-mounted device with polarized glasses.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware.

The invention claimed is:

1. An image processing unit for generating, based on a plurality of input images, a first output image and a second output image, to be displayed on a stereoscopic display device, wherein a stereoscopic image and a monoscopic image can be displayed, the image processing unit comprising:
    an offset calculator designed to calculate an offset image based on a first one of the input images;
    an addition unit designed to calculate the first output image by adding the offset image with a second one of the input images; and
    a subtraction unit designed to calculate the second output image by subtracting the offset image from the second one of the input images.

2. An image processing unit as claimed in claim 1, wherein the offset calculator is designed to calculate the offset image by subtracting a third one of the input images from the first one of the input images and dividing by a constant substantially equal to two.

3. An image processing unit as claimed in claim 1, wherein the offset calculator is designed to calculate the offset image by subtracting the second one of the input images from the first one of the input images.

4. An image processing unit as claimed in claim 1, wherein the offset calculator is designed to calculate the offset image by differentiating the first one of the input images.

5. An image processing unit as claimed in claim 1, further comprising a render unit designed to render the input images based on a captured image and a depth map.

6. An image processing unit as claimed in claim 5, wherein the depth map is provided by a depth camera.

7. An image processing unit as claimed in claim 5, further comprising a depth estimation unit designed to generate the depth map based on the captured image.

8. A method of generating, based on a plurality of input images, a first output image and a second output image, to be displayed on a stereoscopic display device, wherein
    a stereoscopic image; and
    a monoscopic image can be displayed the method comprising the steps of:
    calculating an offset image based on a first one of the input images;
    calculating the first output image by adding the offset image with a second one of the input images; and
    calculating the second output image by subtracting the offset image from the second one of the input images.

9. A method as claimed in claim 8, wherein the offset image is calculated by subtracting the second one of the input images from the first one of the input images.

10. An image display apparatus comprising:
    image processing unit for generating, based on a number of input images, a first output image and a second output image, to be displayed on a stereoscopic display device resulting in:
    a stereoscopic image in the case of a first observer who perceives the first output image the second output image substantially separate in a left and a right eye; and
    a monoscopic image in the case of a second observer who perceives the first output image and the second output image substantially both in both eyes; and
    the stereoscopic display device, wherein the image processing unit comprises:
    an offset calculator designed to calculate an offset image based on a first one of the input images;
    an addition unit designed to calculate the first output image by adding the offset image with a second one of the input images; and
    a subtraction unit designed to calculate the second output image by subtracting the offset image from the second one of the input images.

* * * * *